United States Patent [19]
Rollinger

[11] Patent Number: 5,350,434
[45] Date of Patent: Sep. 27, 1994

[54] PROCESS AND APPARATUS FOR MAKING MOLTEN STEEL

[75] Inventor: Bernt Rollinger, Taunusstein, Fed. Rep. of Germany

[73] Assignee: Metallgesellschaft AG, Frankfurt am Main, Fed. Rep. of Germany

[21] Appl. No.: 61,765

[22] Filed: May 13, 1993

[30] Foreign Application Priority Data

May 14, 1992 [DE] Fed. Rep. of Germany ....... 4215858

[51] Int. Cl.$^5$ .............................................. C22B 4/00
[52] U.S. Cl. ................................... 75/10.63; 75/501; 75/503; 75/504
[58] Field of Search .................. 75/10.63, 501, 503, 75/504

[56] References Cited

U.S. PATENT DOCUMENTS

| | | | |
|---|---|---|---|
| 3,033,673 | 5/1962 | Collin | 75/10.59 |
| 4,304,598 | 12/1981 | von Bogdandy | 75/532 |
| 4,957,545 | 9/1990 | Hikosaka | 75/532 |
| 5,000,784 | 3/1991 | Takahashi | 75/501 |

FOREIGN PATENT DOCUMENTS 3045966 8/1982 Fed. Rep. of Germany .
3735150 3/1989 Fed. Rep. of Germany .

*Primary Examiner*—Peter D. Rosenberg
*Attorney, Agent, or Firm*—Michael J. Striker

[57] ABSTRACT

The process for making a refined molten steel includes melting preheated solid iron sources and solid carbon sources in a melting vessel with heat generated by electric arc to form a carbon-containing molten material and then melting other preheated solid iron and carbon sources in the carbon-containing molten material by heat generated by combustion reaction in the melting vessel. In the combustion reaction oxygen is fed into the molten material through nozzles located in the melting vessel below the surface of the molten bath. The exhaust gases formed in the melting vessel are used to preheat the solid iron sources and then are burned in an afterburner to reduce pollution. An apparatus for performing the process is also described.

22 Claims, 1 Drawing Sheet

PROCESS AND APPARATUS FOR MAKING MOLTEN STEEL

BACKGROUND OF THE INVENTION

The present invention relates to a method and apparatus for making molten steel from solid iron sources.

Molten steel can be made from solid iron sources, such as scrap iron, scrap steel, solid crude iron, sponge iron and mixtures of such materials, by a process which comprises melting and simultaneously or subsequently refining the source materials. For economy it is particularly important that the melting heat be supplied with an optimum efficiency to the solid iron sources to be melted and/or the metal bath used for melting. It is known to supply the melting heat by feeding electrical energy into the molten bath or by burning carbon with oxygen in the molten bath. To refine the carbon-containing molten material to a carbon content below 0.4% by weight, oxygen or oxygen-enriched air is blown into or onto the molten material. Refining may be effected after or during the melting operation.

Published German Patent Application 3,735,150 discloses a process of supplying thermal energy to molten metal. In that process solid carbon and solid metallic materials, preferably scrap steel, which are to be melted, are fed to the melting vessel and oxygen is blown through submerged nozzles into the molten material which has remained in the melting vessel or into molten metal which is being charged into the melting vessel. In that known process it is contemplated to charge carbon in the form of sheet metal-sheathed coal briquettes. Published German Patent Application 3,045,966 discloses a process of refining molten metal, particularly liquid hot metal, in an open-hearth furnace, in an electric arc furnace, or in a converter by an oxygen-containing gas which is fed into the bath below its surface. The oxygen-containing gas is fed through nozzles, which consist of a plurality of concentric tubes. An oxygen-containing gas is conducted through the central tube and a protecting fluid is conducted through the first concentric tube and consists of a gaseous or liquid hydrocarbon or of water or of organic hydroxyl compounds.

In all known processes the melting heat supplied to the melting vessel is utilized only with an inadequate efficiency so that melting, particularly of large quantities of scrap, within a predetermined time is difficult to achieve.

SUMMARY OF THE INVENTION

It is an object of the present invention to provide a process and apparatus for making molten steel in which melting heat is utilized with increased efficiency and which can be performed in a satisfactory manner.

According to the present invention, the process for making molten steel comprises:

a) loading preheated solid iron sources and preheated lumps of solid carbon sources into a melting vessel and melting them by heat generated with an electric arc to form a carbon-containing molten material which contains 0.3 to 2.0% by weight carbon;

b) melting additional preheated solid iron sources and additional preheated lumps of solid carbon sources added to the carbon-containing molten material by heat generated by a combustion reaction of oxygen and carbon in which oxygen is fed into the molten material through nozzles, which are arranged in the melting vessel below the surface of the molten bath to form a refined molten material with a carbon content below 0.4% by weight;

c) feeding an oxygen-containing gas into the melting vessel above the surface of the molten bath during the feeding of oxygen into the molten material in step b);

d) preheating solid iron sources with an exhaust gas formed during process steps a) and b) to form the preheated solid iron sources; and e) tapping the melting vessel to obtain the refined molten material which consists of a slag-free molten steel.

According to the invention two different melting operations are combined, namely, an electric arc melting operation and a converter melting operation. That combination results in a particularly high utilization of the total melting heat which is supplied and an oxidation of iron is substantially avoided. The utilization of energy is additionally improved since the exhaust gases formed in the two melting operations preheat the solid iron sources. A special advantage of the process in accordance with the invention is that no CO can escape into the atmosphere during the transition between the two melting operations, because CO is formed only in the converter melting step. Additional melting heat is generated by the oxygen-containing gas which is introduced in process step c) because a part of the CO formed in the molten material is combusted with the carbon to form $CO_2$.

According to a further feature of the invention the solid iron sources are preheated to a temperature of 500° to 1200° C. By that step the amount of melting heat which is to be generated in the melting vessel is desirably decreased.

In a preferred embodiment of the invention coal briquettes sheathed with sheet steel are used as lumps of solid carbon sources. The coal briquettes consist of particulate coal having a particle diameter from >0 to 12 mm. In the process according to the invention those features, known per se, ensure that the carbon content of the solid carbon sources is almost entirely converted in the melting vessel to CO by oxidation and is thus used to generate melting heat and the sheet steel with which the coal briquettes are sheathed does not adversely affect the composition of the molten steel. It has also been found that it is desirable to use coal briquettes which contain 10 to 50% by weight particulate metallic heat conductors having a particle diameter of 0.1 to 10 mm. Particularly suitable metallic heat conductors include particulate alloys, such as ferrosilicon, magnesium silicide, and aluminum alloys. The metals silicon, magnesium, and aluminum act in the molten material as deoxidizers. To permit an escape of the gases which are evolved as the coal briquettes are heated, the sheet steel with which the coal briquettes are sheathed is, in accordance with the invention, not perfectly gastight, but is provided with holes for example. Also in a preferred embodiment it is desirable to preheat the coal briquettes sheathed with sheet steel together with solid iron sources, because in that step the coal briquettes are dried and degassed in the preheated and are optimally mixed therein with the solid iron sources.

According to another feature of the invention particulate solid low-ash carbonaceous fuels having a particle diameter from 0.01 to 1.5 mm are loaded into the carbon-containing molten material during the process step b) through nozzles arranged in the melting vessel below the surface of the carbon-containing molten material. In that case, particulate carbon sources are supplied to the molten material in addition to the lump of solid carbon sources so that the molten material contains a very large amount of carbon and it is thus possible to melt a very large amount of solid iron sources, particularly scrap, without a detrimental oxidation of iron.

In accordance with a preferred embodiment of the invention oxygen and particulate solid low-ash carbonaceous fuels are fed into the molten material through nozzles, each of which consists of three concentric tubes. The fuels are suspended in an inert gas and conducted in the central tube, the oxygen is conducted in the intermediate tube and a cooling fluid is conducted in the outer tube. The cooling fluid preferably consists of water, which is finely dispersed in a carrier gas, or of hydrocarbons or of mixtures of water and hydrocarbons. The use of water vapor has proved particularly desirable. The use of multi-shell nozzles permits a fast combustion of the carbon sources which have been fed to the molten bath and the use of water and water vapor as a protecting fluid ensures a long useful life for the nozzles. It is also possible to introduce the oxygen and particularly low-ash carbonaceous fuels into the molten material through nozzles, each of which consists of two concentric tubes, the oxygen being conducted in the central tube and the fuels, which are suspended in a cooling fluid and/or an inert gas, being conducted in the inner tube.

According to an additional feature of the invention, air, oxygen-enriched air, or oxygen is used as the oxygen-containing gas in process step c). The gases may desirably be used in a preheated state.

According to the invention the exhaust gas which comes from the melting vessel and has been used to preheat the solid iron sources is afterburnt at a temperature less than 850° C. and the afterburner is supplied, on the one hand, with air, oxygen-enriched air or oxygen and, on the other hand, with a partial stream of CO-containing exhaust gas evolved in process step b). Because of this, pollutants, such as CO and dioxin, in the exhaust gas discharged into the atmosphere are consumed or avoided.

According to a further feature of the process according to the invention the exhaust gas formed in process step a) is cooled to a temperature of 1100° to 1300° C. by addition of air and/or water before the exhaust gas is used to preheat the solid iron sources and that the CO-containing exhaust gas formed in process step b) is sufficiently combusted until it reaches a temperature of 1100° to 1300° C. prior to preheating the solid iron sources. This results in a uniform preheating of the solid iron sources and lumps of solid carbon sources and no overheating or undesirably low temperature can occur in the preheater although the exhaust gases formed in process steps a) and b) have different properties.

The apparatus for making molten steel according to the invention comprises a preheater for the solid iron sources, an exhaust gas hood, a pivoted cover provided with at least one electrode and an exhaust gas outlet, a pivoted combustion chamber provided with an exhaust gas outlet, and at least one tiltable melting vessel, which has a tap, at least one blowing lance opening above the surface of the molten bath, and at least one nozzle, which opens below the surface of the molten bath and consists of two or three concentric tubes. That apparatus can be used to carry out the process described above in accordance with the invention without interference.

This apparatus guarantees that no CO can escape into the atmosphere. The pivotal mounting of the cover for the arc melting operation and of the combustion chamber for the converter melting operation permits both melting operations to be performed in one melting vessel. Because the preheater is used under different conditions during the operation of the melting vessel, the energy balance of the overall plant is greatly improved. The arc melting operation can be performed with alternating current and with direct current. If alternating current is used, the cover is provided with at least two electrodes, between which an electric arc is struck. If direct current in used, the cover is provided with one electrode, the second electrode is mounted in the bottom of the melting vessel and the direct current flows between the two electrodes through the molten material or through a more or less distinct electric arc.

In accordance with the invention at least one chamber of the preheater contains an empty space, in which the CO-containing exhaust has formed in process step b) is sufficiently combusted so as to be at a temperature of 1100° to 1300° C. so that a constant preheating of the solid iron sources is permitted during that stage.

In a preferred embodiment of the apparatus of the invention the preheater is followed by an afterburning chamber, which is connected by a duct to the exhaust gas hood. Because of that feature, the maintenance of a temperature of 850° C. with a small expenditure of extraneous energy is ensured in the afterburning chamber with utilization of CO produced in the melting vessel so that the pollutants contained in the exhaust gas, particularly CO and dioxines, are destroyed.

An additional feature of the apparatus of the invention is that the volume of the combustion chamber is 20 to 50% of the volume of the melting vessel which is disposed above the surface of the molten bath.

Because the carbon is fed into the molten bath in the form of solid lumps and additionally in particulate form and during the blowing of oxygen into the molten bath the combustion of that carbon results almost exclusively in a formation of CO. Then the CO is burned above the surface of the molten bath so hat additional thermal energy is fed to the molten bath. It has surprisingly been found that the heat generated in the free furnace space is particularly efficiently utilized if the volume of the combustion chamber is 20 to 50% of that part of the volume of the melting vessel which is free and does not contain molten material.

BRIEF DESCRIPTION OF THE DRAWING

The objects, features and advantages of the present invention will now be illustrated in more detail by the following detailed description, reference being made to the accompanying drawing in which:

The sole FIGURE is a flow chart showing a preferred embodiment of the method of the invention and cross-sectional views of portions of the apparatus of the invention.

DESCRIPTION OF THE PREFERRED EMBODIMENTS

Figure 1:
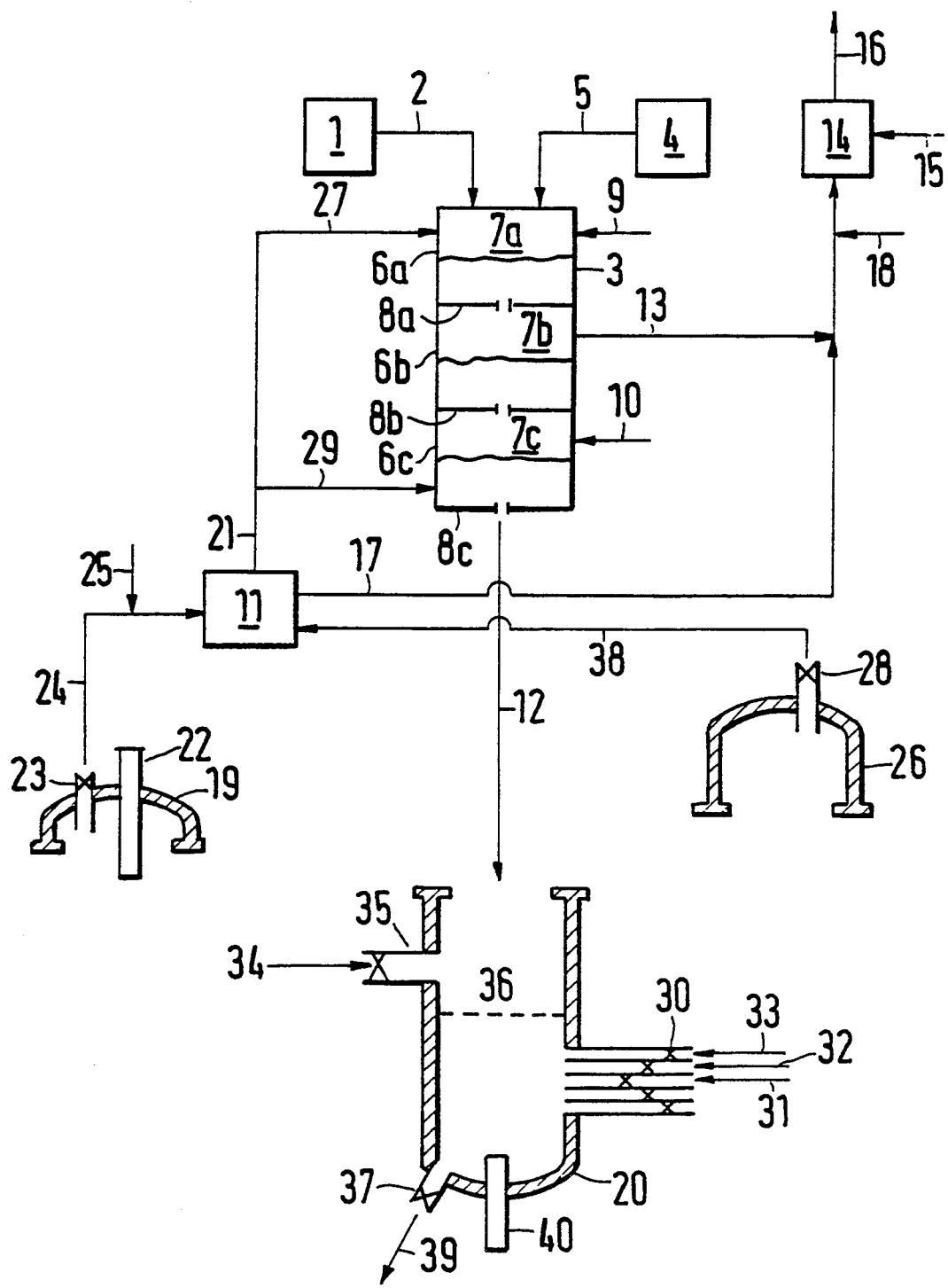

Scrap steel is conveyed by a transporting system 2 from a supply bin 1 to the preheater 3. At the same time, lumps of carbon sources are fed by the transporting system 5 from the supply bin 4 to the preheater 3. The lumps of carbon sources consist of coal briquettes, which are sheathed with sheet steel. The preheater 3 consists of a total of three chambers 6a, 6b, 6c, which are filled with scrap only to about 66% of their capacity so that each chamber 6a, 6b, 6c contains an empty space 7a, 7b, 7c. The chambers 6a, 6b, 6c, have bottoms 8a, 8b, 8c, which have openings for a throughgoing gas flow, and can be moved out of the way be removal from the preheater 3, swinging open within the preheater 3 or a combination of the two movements. During the preheating operation, the hot exhaust gases flow from the melting vessel 20 through the exhaust gas hood 11 and the connecting ducts 21, 27, 29 into the preheater 3 and are divided into two gas streams depending on the existing pressure conditions. One partial stream flows through the chambers 6a, 6b and the other partial stream flows through the chamber 6c. The two partial streams first enter the empty spaces 7a, 7c and are partly combusted therein. They subsequently enter the empty space 7b, from they are drawn. The mixture of lumps of carbon sources and scrap steel is moved through the preheater 3 from top to bottom. This is effected when the bottom 8a is moved out of the way so that the mixture of scrap steel and carbon sources in the first chamber 6a enters the chamber 6b. After that the first chamber 6a is refilled from the supply bins 1 and 4. Thereafter the bottom 8b is moved out of the way so that the mixture in the second chamber 6b enters the third chamber 6c. In the empty spaces 7a, 7c, a part of the exhaust gas is afterburnt to maintain a constant temperature in the preheater 3. To that end, combustion air is supplied to the empty spaces 7a, 7c through ducts 9 and 10. The bottom 8c is tilted so that the preheated mixture of scrap steel and carbon sources leaves the preheater 3 and is charged or loaded through duct 12 into the melting vessel 20.

The cooled exhaust gas which has left the preheater 3 flows through the duct 13 to the afterburner chamber 14, in which a temperature >850° C. is always maintained. Air is supplied through duct 15 to the afterburner chamber 14, in which the pollutants which have left the preheater 3 are destroyed and/or oxidized. The exhaust gas leaves the after burner chamber 14 through the duct 16 and can be discharged into the atmosphere after it has been cooled and dedusted. The temperature required for afterburning is maintained by feeding a partial stream of exhaust gases formed in process step b) through duct 17 to the afterburner 14 or by feeding a gaseous fuel in duct 18 to the afterburner chamber 14 during process step a).

The process according to the invention is performed in a melting vessel 20 which is filled through duct 12 with a preheated mixture of scrap iron and carbon sources. Thereafter the pivoted cover 19 is gastightly joined to the melting vessel 20.

That charge or load is melted by electrical energy, which is supplied to the melting vessel 20 via the electrode 22. The exhaust gases formed during the electric melting flow through the exhaust gas outlet 23 of the cover 19 and the duct 24 into the exhaust gas hood 11 and from the latter flow through the preheater 3.

The exhaust gas conducted in duct 24 are at a temperature from 1500 to 1600° C. and for this reason must be cooled to a temperature from 1100° to 1300° C. by an addition of air or water. The cooling fluid is supplied through line 25 into the duct 24.

When the electric melting operation has been completed, the cover 19 is lifted and swung away from the melting vessel 20. From the last chamber 6c of the preheater 3 the preheated mixture of scrap steel and carbon sources is fed in the duct 12 to the melting vessel 20. Similarly the contents of the chamber 6b is fed through chamber 6c to the melting vessel 20. The combustion chamber 26, which is provided with an exhaust gas outlet 28, is then swung over the melting vessel 20 and is connected thereto. Thereafter, the scrap steel is melted in process step b) in which fine solid carbon sources and oxygen are blown into the metal bath through the nozzle 30, which is connected to the melting vessel 20 and opens below the surface 36 of the molten bath. The nozzle 30 consists of three concentric tubes. The particulate solid fuel 31 is blown through the central tube and the oxygen 32 is blown through the intermediate tube into the molten material. A cooling fluid 33 is blown into the molten material through the outer tube of the nozzle 30. The blowing of the particulate fuel and of the oxygen into the molten material results in heat generation and formation of considerable amounts of CO, at least part of which is combusted in the free furnace space above the surface 36 of the molten bath. The free furnace space consists of that volume of the melting vessel 20 which is not occupied by the molten material and of the volume of the combustion chamber 26. Oxygen-containing gas 34 is supplied through a blowing lance 35 above the surface 36 of the molten bath. The exhaust gas which is formed flows through the outlet 28, the duct 38 and the exhaust gas hood 11 into the preheater 3. Part of the exhaust gas which is formed in the molten material during the blowing of carbon and oxygen into the molten material is supplied in duct 17 to the afterburner chamber 14.

After the melting operation the carbon-containing molten material in the melting vessel 20 is refined by blowing oxygen through the nozzle 30 so that molten steel which contains less than 0.4% carbon is formed. The exhaust gas formed during the refining is also afterburnt with oxygen in the free furnace space and is subsequently supplied through the duct 38 and the exhaust gas hood 11 to the preheater 3. When the refining has been completed, the molten steel 39 is discharged from the tiltable vessel 20 through the tap 37. Thereafter the melting vessel 20 is refilled with a charge of scrap steel and lumps of carbon sources and is closed by the cover 19. An electrode 40 is mounted in the bottom of the melting vessel 20 and coacts with the electrode 22.

While the invention has been illustrated and embodied in a process and apparatus for making molten steel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. Process for making molten steel comprising the steps of:

a) melting preheated solid iron sources and preheated lumps of solid carbon sources loaded into a melting vessel with heat generated by an electric arc to form a carbon-containing molten material having a surface and containing 0.3 to 2.0% by weight carbon and to form an electric arc-generated exhaust gas;

b) melting additional preheated solid iron sources and additional preheated lumps of solid carbon sources loaded into the carbon-containing molten material in the melting vessel with heat generated by a combustion reaction, said combustion reaction being performed by feeding oxygen into the molten material during said reacting through nozzles, said nozzles being arranged in the melting vessel below the surface of the molten material, to form a refined molten material having a carbon content below 0.4% by weight and to form a combustion exhaust gas;

c) feeding an oxygen-containing gas into the melting vessel above the surface of the molten material during said feeding of said oxygen into the molten material in step b); and d) preheating solid iron sources with said electric arc-generated exhaust gas formed during said step a) and with said combustion exhaust gas formed during step b) in said melting vessel to form the preheated solid iron sources.

2. Process as defined in claim 1, further comprising tapping the melting vessel to obtain the refined molten material which consists of a slag-free molten steel.

3. Process as defined in claim 1, comprising charging said preheated solid iron sources and said preheated lumps of solid carbon sources into said melting vessel prior to melting with said heat from said electric arc.

4. Process as defined in claim 1, wherein said preheating of said solid iron sources produces said preheated solid iron sources at temperatures from 500° to 1200° C.

5. Process as defined in claim 1, wherein said preheated lumps of solid carbon sources comprise coal briquettes sheathed with sheet steel.

6. Process as defined in claim 5, wherein said coal briquettes consist of particulate coal having a particle diameter of 0 to 12 mm.

7. Process as defined in claim 5, wherein said solid carbon sources also include 10 to 50% by weight heat conducting metallic particles having particle diameters of 0.1 to 10 min.

8. Process as defined in claim 5, wherein said sheet steel sheathing said coal briquettes is not perfectly gas-tight.

9. Process as defined in claim 5, further comprising preheating said solid carbon sources to form said preheated solid carbon sources and wherein said coal briquettes sheathed with sheet steel are preheated together with said solid iron sources to form said preheated solid iron sources as well as said preheated solid carbon sources.

10. Process as defined in claim 1, further comprising feeding particulate solid low-ash carbonaceous fuels having particle diameters from 0.01 to 1.5 mm into the carbon-containing molten material during said step b) through said nozzles arranged below the surface of the molten material in the melting vessel.

11. Process as defined in claim 1, further comprising feeding particulate solid low-ash carbonaceous fuels into the molten material through at least one of said nozzles together with said oxygen, each of said at least one nozzles consisting of three concentric tubes consisting of a central tube, an intermediate tube and an outer tube; said fuels being fed in an inert gas in said central tube, said oxygen being fed in said intermediate tube and a cooling medium being fed in said outer tube.

12. Process as defined in claim 1, further comprising feeding particulate solid low-ash carbonaceous fuels into the molten material through at least one of said nozzles together with said oxygen, each of said at least one nozzles consisting of two concentric tubes consisting of a central tube and an inner tube; said oxygen being fed through said central tube and said fuels being fed through said inner tube suspended in one of a cooling fluid and an inert gas.

13. Process as defined in claim 1, wherein said oxygen-containing gas is a member selected from the group consisting of oxygen-enriched air, air and oxygen.

14. Process as defined in claim 1, wherein said combustion exhaust gas formed during said step b) in the melting vessel is a CO-containing exhaust gas, and further comprising afterburning said CO-containing exhaust gas in an afterburner to form an afterburned exhaust gas at a temperature of less than 850° C., preheating said solid iron sources with said afterburned exhaust gas and supplying said afterburner with said CO-containing exhaust gas and with a member selected from the group consisting of air, oxygen-enriched air and oxygen to burn the CO-containing exhaust gas.

15. Process as defined in claim 1, wherein said electric arc-generated exhaust gas formed during the melting step a) in the melting vessel is a CO-containing exhaust gas and cooling said CO-containing exhaust gas to a temperature of 1100° to 1300° C. by adding a member selected from the group consisting of air, water and mixtures of air and water to said CO-containing exhaust gas prior to preheating said solid iron sources with said CO-containing exhaust gas to form said preheated solid iron sources.

16. Process as defined in claim 14, wherein said CO-containing exhaust gas is heated to a temperature from 1100° to 1300° C. during said afterburning.

17. An apparatus for making molten steel comprising a preheater (3), an exhaust gas hood (11), a pivoted cover (19) provided with at least one electrode (22) and an exhaust gas outlet (23), a pivoted combustion chamber (26) provided with an exhaust gas outlet (28), and at least one tiltable melting vessel (20) for a molten material and having a tap (37), at least one blowing lance (35) opening in the melting vessel above a surface (36) of the molten material, and at least one nozzle (30) opening below the at least one blowing lance (35) and below the surface (36) of the molten material, said nozzle consisting of a plurality of concentric tubes.

18. An apparatus as defined in claim 17, wherein each of said at least one nozzles consists of two concentric tubes.

19. An apparatus as defined in claim 17, wherein each of said at least one nozzles consists of three concentric tubes.

20. An apparatus as defined in claim 17, further comprising an afterburner chamber (14) connected by a duct (17) with said exhaust gas hood, said exhaust gas hood being connected to said exhaust gas outlets of said pivoted cover and said pivoted combustion chamber.

21. An apparatus as defined in claim 20, wherein said exhaust gas hood is connected with said preheater so as to be able to supply exhaust gas to said preheater for preheating solid iron sources and carbon sources.

22. An apparatus as defined in claim 17, wherein said combustion chamber (26) has a volume and said volume of said combustion chamber is 20 to 50% of a volume of said melting vessel above a surface of said molten material.

* * * * *